United States Patent
Harris et al.

(10) Patent No.: US 8,180,986 B2
(45) Date of Patent: May 15, 2012

(54) MEMORY CONFLICT DETECTION VIA MAPPING OF THE PHYSICAL HEAP TO CONTROL ACCESS PERMISSIONS TO THE MEMORY

(75) Inventors: Timothy Harris, Cambridge (GB); Martin Abadi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 907 days.

(21) Appl. No.: 12/212,025

(22) Filed: Sep. 17, 2008

(65) Prior Publication Data

US 2010/0070727 A1    Mar. 18, 2010

(51) Int. Cl.
*G06F 12/00* (2006.01)

(52) U.S. Cl. ......... 711/163; 711/170; 711/158; 711/147

(58) Field of Classification Search ............... 711/163, 711/170, 158, 147
See application file for complete search history.

(56) References Cited

U.S. PATENT DOCUMENTS

| | | | |
|---|---|---|---|
| 7,065,630 B1 * | 6/2006 | Ledebohm et al. | 711/206 |
| 2002/0099918 A1 * | 7/2002 | Avner et al. | 711/170 |
| 2004/0168030 A1 * | 8/2004 | Traversat et al. | 711/133 |
| 2006/0085588 A1 | 4/2006 | Rajwar et al. | |
| 2007/0118579 A1 | 5/2007 | Hudson | |
| 2007/0143276 A1 | 6/2007 | Harris | |
| 2007/0288708 A1 | 12/2007 | Saha et al. | |
| 2008/0010417 A1 * | 1/2008 | Zeffer et al. | 711/144 |
| 2008/0126740 A1 * | 5/2008 | Wrighton et al. | 711/208 |
| 2008/0162886 A1 | 7/2008 | Saha et al. | |
| 2009/0319739 A1 * | 12/2009 | Shpeisman et al. | 711/163 |
| 2010/0017572 A1 * | 1/2010 | Koka et al. | 711/159 |

OTHER PUBLICATIONS

Abadi, et al., "A Model of Dynamic Separation for Transactional Memory", retrieved on Dec. 9, 2008 at <<www.cse.ucsc.edu/~abadi/Papers/separationtheory-concur.pdf>>, Springer-Verlag, Lecture Notes in Computer Science, Conference on Concurrency Theory (CONCUR), vol. 5201, 2008, pp. 6-20.

Abadi, et al., "Dynamic Separation for Transactional Memory", retrieved on Aug. 7, 2008 at <<http://research.microsoft.com/~tharris/papers/2008-dynsep-tr.pdf>>, Microsoft Research Technical Report TR-2008-43, 2008, pp. 1-13.

Abadi, et al., "Semantics of Transactional Memory and Automatic Mutual Exclusion", ACM SIGPLAN-SIGACT Symposium on Principles of Programming Languages (POPL), vol. 43, No. 1, 2008, pp. 63-74.

(Continued)

*Primary Examiner* — Hong Kim
(74) *Attorney, Agent, or Firm* — Lee & Hayes, PLLC

(57) ABSTRACT

A transactional memory system is described for reporting memory access violations which occur when memory accesses made from instructions within a transaction conflict with memory accesses to the same memory location made from a non-transactional instruction. In an embodiment this is achieved by creating two mappings of a physical heap being used by a thread. The thread (which may be part of a multi-threaded process) comprises instructions for both transactional and non-transactional accesses to the physical heap which may execute concurrently as part of that thread. One of the mappings is used for non-transactional memory accesses to the physical heap. The other mapping is used for transactional memory accesses to the physical heap. Access permissions associated with the mappings are controlled to enable attempted memory access violations to be detected and reported.

18 Claims, 16 Drawing Sheets

OTHER PUBLICATIONS

Baugh, et al., "Using Hardware Memory Protection to Build a High-Performance, Strongly-Atomic Hybrid Transactional Memory", retrieved on Aug. 7, 2008 at <<http://www-sal.cs.uiuc.edu/~zilles/papers/ufo_hybridTM.isca2008.pdf>>, Symposium on Computer Architecture (ISCA 2008), and ACM SIGARCH Computer Architecture News, vol. 36, No. 3, 2008, pp. 115-126.

Blundell, et al., "Deconstructing Transactional Semantics: The Subtleties of Atomicity", retrieved on Dec. 9, 2008 at <<http://www.cis.upenn.edu/acg/papers/wddd05_atomic_semantics.pdf>>, Workshop on Duplicating, Deconstructing and Debunking, 2005, pp. 1-7.

Carlstrom, et al., "The Software Stack for Transactional Memory, Challenges and Opportunities", retrieved on Aug. 7, 2008 at <<http://ogun.stanford.edu/~kunle/publications/tcc_stmcs2006.pdf>>, Workshop on Software Tools for Multi-Core Systems (STMCS), 2006, pp. 1-4.

Chuang, et al., "Unbounded Page-Based Transactional Memory", retrieved on Dec. 9, 2008 at <<www-cse.ucsd.edu/users/gpokam/ASPLOS-06-PTM.pdf >>, ACM Conference on Architectural Support for Programming Languages and Operating Systems (ASPLOS-XII), 2006, pp. 347-358.

Harris, et al., "Composable Memory Transactions, Post-publication version: Aug. 18, 2006", retrieved on Aug. 7, 2008 at <<http://research.microsoft.com/~simonpj/papers/stm/stm.pdf>>, ACM SIGPLAN Symposium on Principles and Practice of Parallel Programming (PPoPP 2005), revised 2006, pp. 1-13.

Harris, et al, "Language Support for Lightweight Transactions", retrieved on Dec. 9, 2008 at <<research.rnicrosoft.com/en-us/um/people/tharris/papers/2003-oopsla.pdf >>, ACM SIGPLAN Conference on Object-Oriented Programming, Systems, Languages (OOPSLA), 2003, pp. 388-402.

Harris, et al., "Optimizing Memory Transactions", retrieved on Dec. 8, 2008 at <<research.microsoft.com/en-us/um/people/tharris/papers/2006-pldi.pdf >>, ACM SIGPLAN Notices (PLDI Conference), 2006, pp. 14-25.

Harris, et al., "Pay-to-use strong atomicity on conventional hardware", slides presented at eta workshop in Dagstuhl, Germany, Jun. 6, 2008, pp. 1-12.

Herlihy, et al., "Software Transactional Memory for Dynamic-Sized Data Structures", retrieved on Dec. 9, 2008 at <<www.cs.rice.edu/~wns1/papers/2003-PODC-DSTM.pdf>>, ACM Symposium on Principles of Distributed Computing (PODC), 2003, pp. 92-101.

Herlihy, et al., "Transactional Memory: Architectural Support for Lock-Free Data Structures", retrieved on Dec. 9, 2008 at <<www.cs.brown.edu/~mph/HerlihyM93/herlihy93transactional.pdf>>, IEEE Computer Society Symposium on Computer Architecture, 1993, pp. 289-301.

Hindman, et al., "Strong Atomicity for Java Without VirtualMachine Support", retrieved on Dec. 9, 2008 at <<www.cs.washington.edu/homes/djg/papers/atomjava_tr_may06.pdf >>, Technical Report UW-CSE May 1, 2006, pp. 1-19.

Marathe, et al., "Lowering the Overhead of Nonblocking Software Transactional Memory", retrieved on Aug. 7, 2008 at <<http://www.cs.rochester.edu/u/scott/papers/2006_TR893_RSTM.pdf>>, ACM SIGPLAN Workshop on Languages, Compilers, and Hardware Support for Transactional Computing, 2006, pp. 1-26.

Matveev, et al., "Dynamic Identification of Shared Transactional Locations", unpublished manuscript, Tel-Aviv University, 2007, pp. 1-9.

Menon, et al., "Practical Weak-Atomicity Semantics for Java STM", ACM Symposium on Parallel Algorithms and Architectures (SPAA), 2008, pp. 314-325.

Menon, et al., "Single Global Lock Semantics in a Weakly Atomic STM", retrieved on Dec. 8, 2008 at <<www.unine.ch/transact08/papers/Menon-Single.pdf>>, ACM SIGPLAN Notices Workshop on Transactional Computing, vol. 43, No. 5, 2008, pp. 15-26.

Minh, et al., "STAMP: Stanford Transactional Applications for Multi-Processing", retrieved on Dec. 9, 2008 at <<www.cs.brandeis.edu/~cs220/reads/2008.stamp.iiswc.pdf>>, IEEE Symposium on Workload Characterization (IISWC), 2008, pp. 1-12.

Moore, et al., "High-Level Small-Step Operational Semantics for Transactions", retrieved on Dec. 9, 2008 at <<www.cs.rochester.edu/meetings/TRANSACT07/papers/moore.pdf >>, ACM SIGPLAN-SIGACT Symposium on Principles of Programming Languages (POPL), 2008, pp. 51-62.

Moore, et al., "LogTM: Log-based Transactional Memory", retrieved on Dec. 9, 2008 at <<www.cs.wisc.edu/multifacet/papers/hpca06_logtm.pdf>>, IEEE Symposium on High-Performance Computer Architecture, 2006, pp. 254-265.

Olszewski, et al., "JudoSTM: A Dynamic Binary-Rewriting Approach to Software Transactional Memory", retrieved on Aug. 7, 2008 at <<http://www.cag.csail.mit.edu/~mareko/judostm-pact07.pdf>>, IEEE Computer Society, International Conference on Parallel Architecture and Compilation Techniques, 2007, pp. 365-375.

Pattabiraman, et al., "Software Critical Memory: All Memory is Not Created Equal", retrieved on Aug. 7, 2008 at <<http://research.microsoft.com/research/pubs/view.aspx?type=Technical%20Report&id=1174>>, Microsoft Research Technical Report MSR-TR-2006-128, 2006, pp. 1-12.

Pozniansky, et al., "Efficient On-the-Fly Data Race Detection in Multithreaded C++ Programs", ACM SIGPLAN Notices, Symposium on Principles and Practice of Parallel Programming, vol. 38, No. 10, 2003, pp. 179-190.

Rajamani, et al., "ISOLATOR: Dynamically Ensuring Isolation in Concurrent Programs", retrieved on Dec. 9, 2008 at <<research.microsoft.com/pubs/70601/tr-2008-91.pdf>>, Microsoft Research Technical Report MSR-TR-2008-91, 2008, pp. 1-29.

Ratanaworabhan, et al., "Detecting and Tolerating Asymmetric Races", retrieved on Dec. 8, 2008 at <<www.ices.utexas.edu/research/reports/2008/0806.pdf>>, ICES Technical Report 08-06, University of Texas, Austin, 2008, pp. 1-15.

Saha, et al., "McRT-STM: A High Performance Software Transactional Memory System for a Multi-Core Runtime", retrieved on Aug. 7, 2008 at <<http://delivery.acm.org/10.1145/1130000/1123001/p187-saha.pdf?key1=1123001&key2=8870118121&coll=GUIDE&dl=GUIDE&CFID=81165073&CFTOKEN=77671774>>, ACM SIGPLAN Symposium on Principles and Practice of Parallel Programming (PPoPP), 2006, pp. 187-197.

Schneider, et al., "Dynamic Optimization for Efficient Strong Atomicity", ACM SIGPLAN Notices (OOPSLA), vol. 43, No. 10, 2008, pp. 181-194.

Scott, et al., "Delaunay Triangulation with Transactions and Barriers", retrieved on Dec. 9, 2008 at <<www.cs.rochester.edu/u/scott/papers/2007_IISWC_mesh.pdf>>, Benchmarks track, IEEE International Symposium on Workload Characterization (IISWC), 2007, pp. 1-7.

Shavit, et al., "Software Transactional Memory", ACM Symposium on Principles of Distributed Computing, 1995, pp. 204-213.

Shpeisman, et al., "Enforcing Isolation and Ordering in STM", retrieved on Aug. 7, 2008 at <<http://www.cs.washington.edu/homes/djg/papers/tm_pldi07.pdf>>, ACM SIGPLAN Notices, PLDI Conference, vol. 42, No. 6, 2007, pp. 78-88.

Spear, et al., "Privatization Techniques for Software Transactional Memory", Technical Report 915, University of Rochester Computer Science Department, 2007, pp. 1-17.

Steensgaard, "Points-to Analysis in Almost Linear Time", ACM SIGPLAN-SIGACT Symposium on Principles of Programming Languages (POPL), 1996, pp. 32-41.

Wang, et al., "Code Generation and Optimization for Transactional Memory Constructs in an Unmanaged Language", IEEE Symposium on Code Generation and Optimization (CGO), 2007, pp. 34-48.

Yen, et al., "LogTM-SE: Decoupling Hardware Transactional Memory from Caches", retrieved on Dec. 9, 2008 at <<www.cs.wisc.edu/multifacet/papers/hpca07_logtmse.pdf>>, IEEE Symposium on High Performance Computer Architecture (HPCA-13), 2007, pp. 261-272.

* cited by examiner

```
class Sequencer {
    ...
    private int ComputeUniqueSegments(int nthreads) {
      int numUniqueSegment = 0;
      for (int i = 0; i < nthreads; i++)
          numUniqueSegment += this.uniqueSegments[i].Count;
      return numUniqueSegment;
    }
    ...
}
```
1200

```
Genome_Sequencer_ComputeUniqueSegments::
    ... // Prologue omitted for brevity
    mov edi,ecx
    mov esi,edx
    xor ebp,ebp
    xor ebx,ebx
    test edx,edx
    jle done
  loop:
    mov eax,dword ptr [edi+0x20]           // I1
    cmp ebx,dword ptr [eax+0x40000004]     // I2
    jae outOfRange
    mov ecx,dword ptr [eax+ebx*4+0x08]     // I3
    mov eax,dword ptr [ecx+0x40000000]     // I4
    call dword ptr [eax+0x40000088]        // I5
    add ebp,eax
    add ebx,1
    cmp ebx,esi
    jl loop
  done:
    mov eax,ebp
    ... // Epilogue omitted for brevity
    ret
  outOfRange:
    call throwNewIndexOutOfRangeException
```
1201

FIG. 12

```
class Hashtable {
    ...
    public int Count {
        get { return this.count; }
    }
    ...
}
```
1500

```
System_Hashtable_Count::
    push ebp
    mov ebp,esp
    sub esp,4
    mov dword ptr [ebp+-4],ecx
primary:                            // Patch to alternate
    mov eax,dword ptr [ecx+16]      // I10
done:
    mov esp,ebp
    pop ebp
    ret
alternate:
    mov edx,16
    call DirectReadInt32Obj
    jmp done
```
1501

FIG. 15

MEMORY CONFLICT DETECTION VIA MAPPING OF THE PHYSICAL HEAP TO CONTROL ACCESS PERMISSIONS TO THE MEMORY

BACKGROUND

Transactional memory systems allow a thread to demark a series of memory accesses as a transaction. Threads may execute transactions concurrently. Even though transactions run concurrently, the use of a transactional memory system ensures that the transactions are serializable, meaning that they appear to have executed one after the other.

Transactional memory systems are typically used in computer systems implementing multi-threaded processes. The multiple threads typically share at least some memory in order that the threads may work together and co-ordinate themselves to complete a task. A transactional memory system enables such multiple threads to share some memory in such a way that each thread may complete its transaction without unwanted interference from another thread.

For example, two different threads of a multi-threaded process may read and update the same memory location accessible by the process. Care is then required to ensure that one thread does not modify a value of the shared memory location while the other thread is in the middle of a sequence of operations that depend on the value.

Consider the following bank account example. A first bank account contains £5 and this amount is stored at a memory address A1. A second bank account contains £100 and this amount is stored at another memory address A2. A first transaction or thread is required to transfer £50 from A2 to A1. A second transaction or thread is required to calculate the total amount in the combined bank accounts. Suppose the first thread begins by adding £50 to A1 and this updates the amount stored at A1 to £55. The first thread then proceeds to take away £50 from A2 updating A2 to £50. But, if the second thread executes between these two operations then the second thread may compute an incorrect balance of £155 for both bank accounts rather than the correct total of £105.

Transactional memories may be implemented in software or hardware or hybrids of software and hardware. They provide a means whereby a thread can safely perform a series of shared memory accesses, allowing the thread to complete its transaction, without unwanted interference from another thread. Use of transactional memory systems to manage concurrent threads or processes is often referred to as concurrency control. Typically, programming languages for use with transactional memory systems enable programmers to specify atomic blocks such that there is concurrency control within atomic blocks. In the bank account example given above, a programmer might specify that the first thread's transfer should be atomic so that money is not missed in-transit, and that the second thread's summation is atomic so that it may compute the correct cumulative total for both accounts.

Many existing implementations of atomic blocks in programming languages used with transactional memory systems provide weak atomicity. That is, there is no concurrency control between operations done inside atomic blocks and operations done outside atomic blocks. Operations done inside an atomic block are thought of as making transacted accesses to shared memory locations whereas operations done outside an atomic block are referred to as making non-transacted accesses to memory locations which may or may not be shared.

Existing implementations which use weak atomicity suffer from concurrency control problems. For example, consider the following two threads. Thread 1 comprises an atomic block and a non-transactional update to the variable x. Thread 2 comprises another atomic block.

```
//Initially x==0, x_shared = true
// Thread 1              //Thread 2
atomic {                 atomic {
   x_shared = false;        if (x_shared) {
}                              x++;
x=100                     } }
```

A programmer might reason that Thread 1's update to x_shared allows its subsequent update to x to be made as a normal non-transactional store. After these fragments have run, a programmer might expect that x==100 whichever order the atomic blocks ran in. However, implementations over transactional memory can lead to other results, e.g. x==1 if the implementation of Thread 2's atomic block was still writing back a buffered update to x concurrently with Thread 1's non-transactional store.

To address these problems transactional memories which provide for implementation of atomic blocks that guarantee strong atomicity may be used. Where strong atomicity is guaranteed there is concurrency control between transacted and non-transacted accesses to shared memory. Existing software transactional memory implementations of strong atomicity work by modifying code outside atomic blocks to detect conflicts with concurrent transactions. These accesses are expanded to optimized forms of short transaction. These perform substantially slower than direct accesses, and so performance is typically poor.

Some implementations of software transactional memory with strong atomicity use whole-program analyses to reduce the number of memory accesses that must be expanded in this way. However, the static analysis may require the complete program source code to be available, and it may be time consuming or resource intensive to perform the analysis. Furthermore, the static analysis is typically conservative in the sense that some memory accesses will still be expanded even though they do not experience conflicts during a particular programme execution.

The embodiments described below are not limited to implementations which solve any or all of the problems mentioned above.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A transactional memory system is described. In an embodiment the system may be used for reporting memory access violations which occur when memory accesses made from instructions within a transaction conflict with memory accesses to the same memory location made from a non-transactional instruction. In an embodiment this is achieved by creating two mappings of a physical heap being used by a thread. The thread (which may be part of a multi-threaded process) comprises instructions for both transactional and non-transactional accesses to the physical heap which may execute concurrently as part of that thread. One of the two mappings (called a "normal heap" for ease of reference) is used for non-transactional memory accesses to the physical heap. The other mapping (called a "transactional heap" for ease of reference) is used for transactional memory accesses to the physical heap. In an embodiment, the physical heap has physical memory pages and for each of those pages, two corresponding virtual page mappings exist, one in the normal heap and one in the transactional heap. In an embodiment, access permissions on the virtual pages are controlled to enable attempted memory access violations to be detected and reported. A conflict policy may optionally be worked in the event that an attempted memory access violation is reported.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 12 is an example code fragment;

FIG. 15 is an example code fragment illustrating a dynamic patch sequence;

Like reference numerals are used to designate like parts in the accompanying drawings.

DETAILED DESCRIPTION

Figure 1:
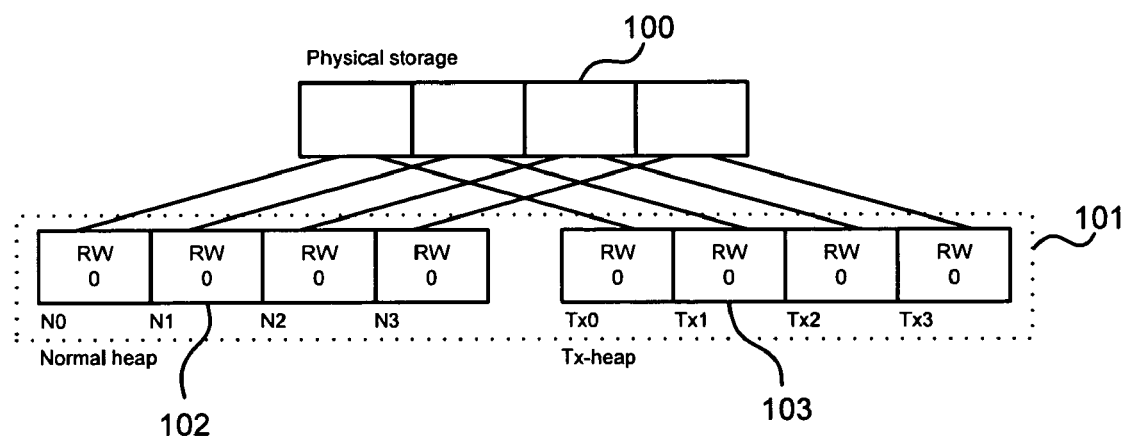
FIG. 1 is a schematic diagram of at least part of a heap 100 to be used by a process comprising both transactional and non-transactional instructions.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a software transactional memory system, the system described is provided as an example and not a limitation. As those skilled in the art will appreciate, the present examples are suitable for application in a variety of different types of transactional memory systems including those implemented in hardware or combinations of hardware and software.

The term "normal access" is used herein to refer to a process of reading or writing to a memory location as a result of an instruction which is not part of a transaction. This is also referred to as a "non-transactional access".

The term "transactional access" is used herein to refer to a process of reading or writing to a memory location as a result of an instruction which is part of a transaction.

The term "direct access" is used herein to refer to a process of reading or writing a memory location using an ordinary memory-access instruction, bypassing the implementation of the transactional memory.

As mentioned above, existing software transactional memory implementations of strong atomicity work by modifying code outside atomic blocks to detect conflicts with concurrent transactions. These accesses are expanded to optimized forms of short transaction. This expansion is typically conservative in the sense that some normal accesses are expanded even though they do not experience conflicts with transactional accesses. Short transactions are slower than direct accesses, so performance can be poor.

In the embodiments described herein a different approach is taken to implementing strong atomicity. For example, a transactional memory uses memory protection hardware to dynamically identify possible conflicts between transactional accesses and normal accesses. A possible conflict may be identified by an access-violation notification from the memory protection hardware. In response to this notification, the transactional memory can handle the conflict. Various possible responses are described below.

In the embodiments two mappings of a heap in physical memory used by a process are formed in a virtual address space used by the process. One mapping is used when executing inside a transaction and the other mapping is used during normal execution. By forming two mappings of the heap in this way it is possible to selectively prevent normal access to shared memory regions while they are still accessible transactionally. In conjunction with this, any suitable existing transactional memory system may be used to detect conflicts between transactions. In the embodiments described herein the shared memory regions are pages. However, it is not essential to operate at the level of pages; any suitable unit of memory may be used. Modification to the compilation of code running inside transactions is used to implement and use the two mappings of the heap. In some embodiments the compilation of the rest of the system is unaffected. An operating system provides mechanisms for a process to configure the structure of its virtual address space in this way.

As mentioned above, a process's virtual address space is structured to provide two views of the process's heap through different virtual address ranges. One of these views is used when making normal accesses to the process's heap; the second it used when making transactional accesses. As a thread of a process runs it configures a processor to report access violations when conflicting accesses are attempted through the two views at the same time. This may be achieved using a conventional processor's memory management unit to selectively revoke access to parts of the process's virtual address space.

When an access violation occurs this automatically triggers an access violation handler which forms part of the transactional memory system. The access violation handler implements a conflict management policy. Different possible embodiments of this conflict management policy are described herein.

FIG. 1 is a schematic diagram of at least part of a heap 100 to be used by a process comprising both transactional and non-transactional instructions. The heap is optionally also used by one or more other processes being executed concurrently with the present process. The heap 100 comprises physical memory and in this example, four memory regions in the heap are represented by rectangles adjacent one another. As mentioned above, the memory regions may be pages or any other suitable unit of memory. In practice the physical storage may not be contiguous and it may be paged out to disk.

Two mappings 102, 103 of the heap are created in a virtual address space 101 of the process. A first one of these mappings 102 is referred to herein as a "normal heap" and comprises pages N0, N1, N2, N3 in the example shown in FIG. 1. A second one of these mappings 103 is referred to herein as a "transactional heap" and comprises pages Tx0, Tx1, Tx2, Tx3 in the example shown in FIG. 1. The normal heap is used during execution of non-transactional instructions. The transactional heap is used during execution of instructions within a transaction. As illustrated by the arrows in FIG. 1 normal heap page N0 maps to the same physical memory page as does transactional heap page Tx0. Thus each page in the physical memory may be used by two pages of the virtual address space as well as potentially other pages of virtual address spaces of other processes which are not illustrated.

The virtual addresses used by the normal and transactional heaps need not be contiguous as illustrated in FIG. 1. Also, in the example illustrated the normal and transactional heaps are shown at a constant offset from one another in order to simplify the process of translating between addresses. For example, on a 32-bit machine a 1 GB offset may be used and a larger offset may be accommodated on a 64-bit machine. Also, in the example, the same page size is used for pages in the normal heap and pages in the transactional heap. Different page sizes may be used if they are available; for example in embodiments where page permissions are left unchanged on the transactional heap, then a larger page size may be used. Different sizes of offset and different sizes of memory unit may be used depending on the application and equipment being used.

In the example illustrated in FIG. 1 only four pages of memory are shown for clarity. In practice the number of pages may be vastly greater, on the order of 1000s for a given process.

Each memory page in the virtual address space has a protection or access setting associated with it. These protection settings are provided by any suitable mechanism which controls access permissions to the memory locations in the virtual address space. For example, page protection settings are provided as indicated in FIG. 1 by the letters RW in each page of the normal and transactional heaps. The letters RW indicate that the protection setting is currently arranged so that reading and writing to that page is possible. Other possible values of the page protection settings are "R" whereby only reading from the page is possible, and "none" where no reading or writing to the page is possible. Any suitable set of page protection settings may be used. For example, other page protection settings or access permissions such as execute permission may be used. Page protection settings are commonly supported in hardware. However, hardware support to provide the page protection settings is not essential and the page protection settings or other access permissions may be provided in any suitable manner.

In the embodiments described herein, the transactional memory system associates a counter with each page in the virtual address space; that is, with each page of the normal heap and each page of the transactional heap. These counters are illustrated as zeros in the pages of the virtual address space in FIG. 1. In the case of the normal heap this counter is referred to herein as a "transition count". In the case of the transactional heap this counter is referred to herein as a "writer count". The transition count counts the number of times that normal-read-write access is restored to the page. The writer count counts the number of transactions within the process that are currently writing to the page. Using these counters it is possible to detect possible conflicts between transacted and non-transacted accesses. For example, a non-zero writer count indicates to the access violation handler that a page is currently being written to transactionally and so should not be used for direct access. A change to the transition count indicates, to a transactional reader (which is also part of the transactional memory system) that the page has reverted to normal access at least once during a current transaction.

A concurrency control mechanism may be used to co-ordinate updates to the counts and changes to the page protection settings. In a preferred embodiment a single machine word is used to hold both counts, the current page protection status, and a single-bit test-and-set spin lock. The spin-lock provides exclusive-write access to the other fields of the structure, and the right to invoke functions to change the memory protection settings. The data structure may be read without locking (by arranging readers to wait if they see the lock bit set). Other embodiments may use alternative conventional concurrency control mechanisms such as lock-free data structures. An example method, within a transaction, of reading from an object on a page and writing to an object on another page is now described with reference to FIG. 2 and FIG. 3.

Figure 2:
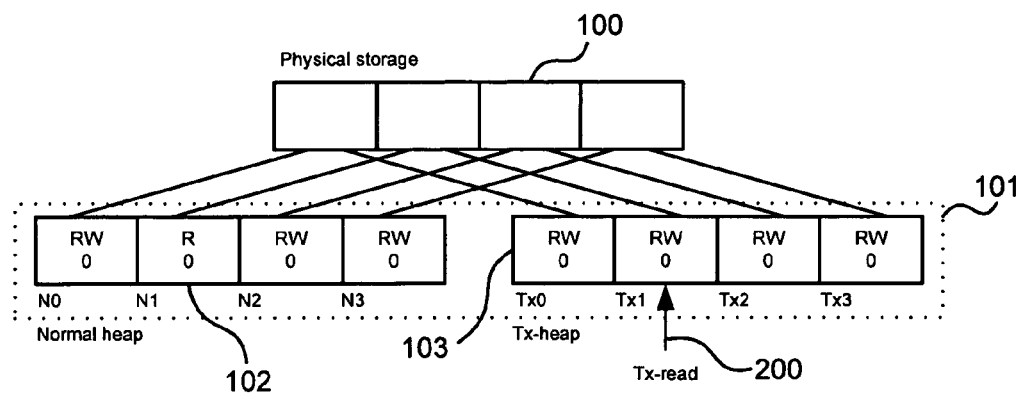
FIG. 2 is a schematic diagram of the heap of FIG. 1 during a transactional read.

FIG. 2 is the same as FIG. 1 except that it shows a read being requested at page Tx1. This is indicated by arrow 200. It also shows the page protection at page N1 changed to read only. This prevents any direct updates from being made to that page. Thus while a page in the transactional heap is being read the page protection of the corresponding page in the normal heap is set to read-only.

The transition count for page N1 is currently zero and this is recorded by the transactional memory system. The requested read proceeds at Tx1.

Figure 3:
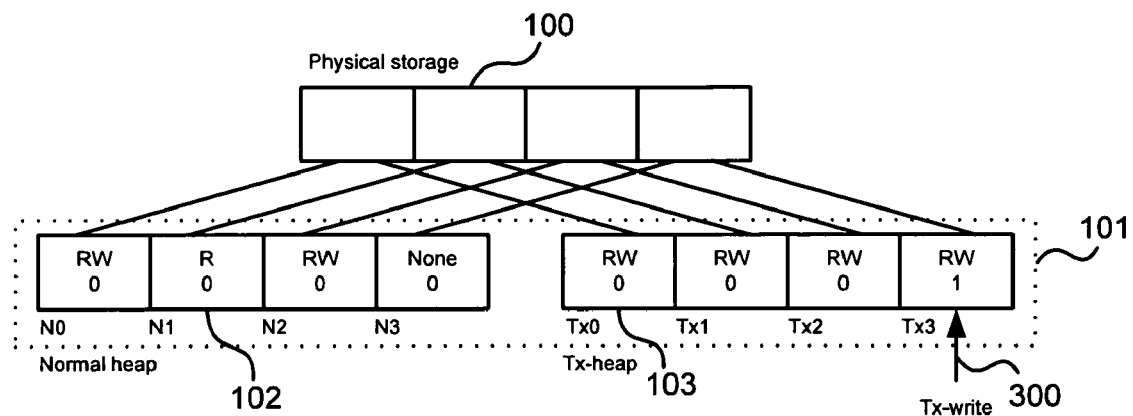
FIG. 3 is a schematic diagram of the heap of FIG. 1 during a transactional write.

FIG. 3 is the same as FIG. 2 except that now a write is requested to an object at page Tx3 as indicated by arrow 300. In response to this, the page protection setting of the corresponding page in the normal heap (N3 in this example) is set to "none". The writer count is incremented on page Tx3 and is shown as a 1 in the rectangle for Tx3 in FIG. 3. Thus when a transactional write is requested, the page protection of the corresponding page in the normal heap is set so as to prevent a conflict. For example, this may be achieved by immediately setting the page protection to "none" on the corresponding page in the normal heap. This immediate revocation of access to the normal heap may be done in cases where the underlying transactional memory system makes in-place updates that need to be hidden from normal reads (that is reads of the normal heap). In other examples, revocation of read access to the normal heap page may be deferred until commit time where the underlying transactional memory system defers updates until commit time. The writer count is incremented and because that count is then non-zero (for example, it may be 1 or two or another non-zero integer) this indicates to the access violation handler that a transactional write is in progress. The access violation handler then knows that access to the normal heap is not possible at present.

Figure 4:
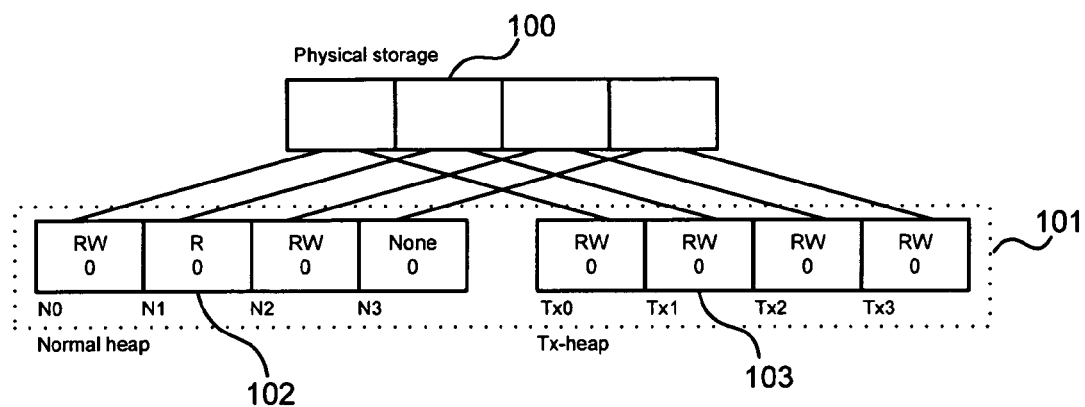
FIG. 4 is a schematic diagram of the heap of FIG. 1 at the commit time of a transaction.

FIG. 4 illustrates the situation when the transaction commits. As mentioned above, any suitable existing transactional memory system may be used to detect conflicts between transactions. This may be a transactional memory system with weak atomicity where conflicts between normal memory accesses and transactional memory accesses may not be detected. Before commit time, the current transaction is validated against any other concurrent transactions and this is achieved using any suitable transactional memory system. Page-level validation is then carried out for any pages of physical memory that have been read during the transaction. In the examples of FIGS. 2 to 3 only the page of physical memory corresponding to pages N1 and Tx1 has been read. The page-level validation is achieved by comparing the page's transition count at commit time against the value logged before the read. In this example, the page's transition count at commit time is 0 for page N1 and the value logged before the read was also 0. Therefore, page-level validation is successful.

After the transaction has finished committing the writer counts are decremented on the pages that the transaction has written to. In the examples of FIGS. 2 to 4 the transaction has only written to page Tx3 (see 300 in FIG. 3) and the writer count for this page is reduced from 1 to 0 in FIG. 4. However, note that the page protection settings are left unchanged at commit time. Thus the protection setting for page N3 remains at "none".

Figure 5:
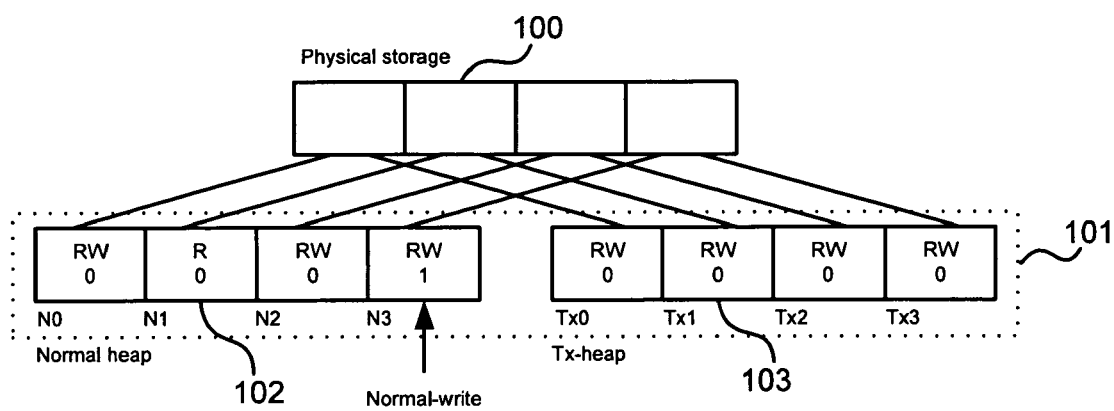
FIG. 5 is a schematic diagram of the heap of FIG. 1 during an attempted normal write.

FIG. 5 shows an example where an access violation is triggered. In this example, non-transacted code causes a write to page N3 in the normal heap. However, the page protection setting still remains at "none". This invalid access triggers an access violation, causing the processor to execute the access violation handler. In this case, the access violation handler may be arranged to wait until there are no concurrent writers (in this case, waits until Tx3's writer count is 0), to increment N3's transition count (to cause any concurrent transactional readers to be aborted), and restores normal read-write access to the page (changes the page protection on N3 from "none" to "RW").

Figure 6:
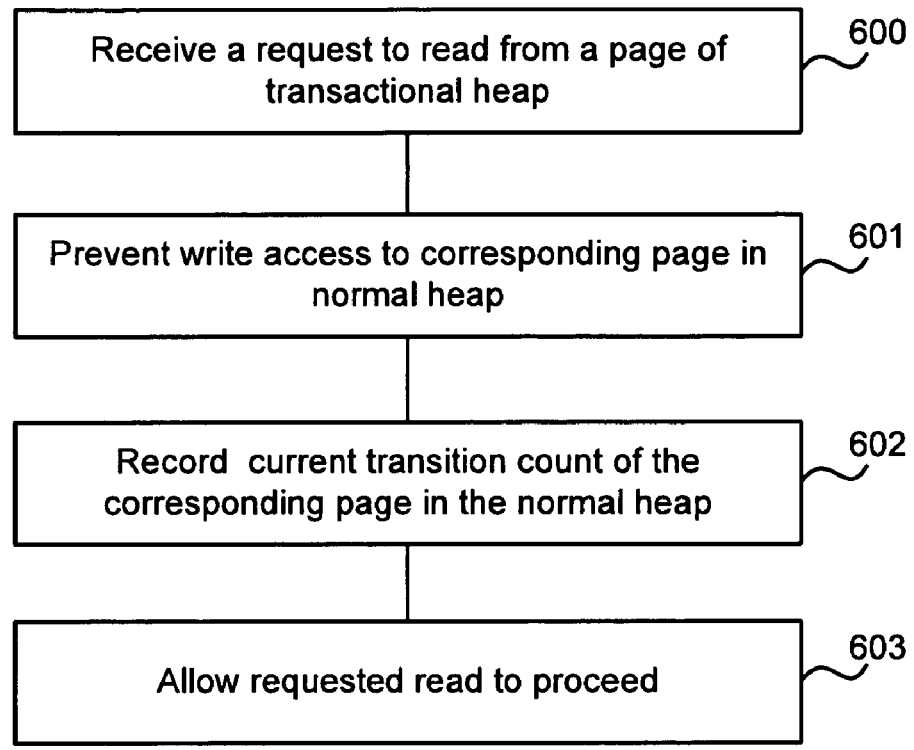
FIG. 6 is a block diagram of a method of making a transactional read at a transactional memory system.

FIG. 6 is a block diagram of an example method at the transactional memory system during a transactional read. A request for a read from a page of the transactional heap is received (block 600) and a check is made to ensure that the page protection setting of the corresponding page in the normal heap is set at read-only 601. If not, it is changed to read-only. The current transition count of the corresponding page in the normal heap is recorded 602 and the request read is allowed to proceed 603.

Figure 7:
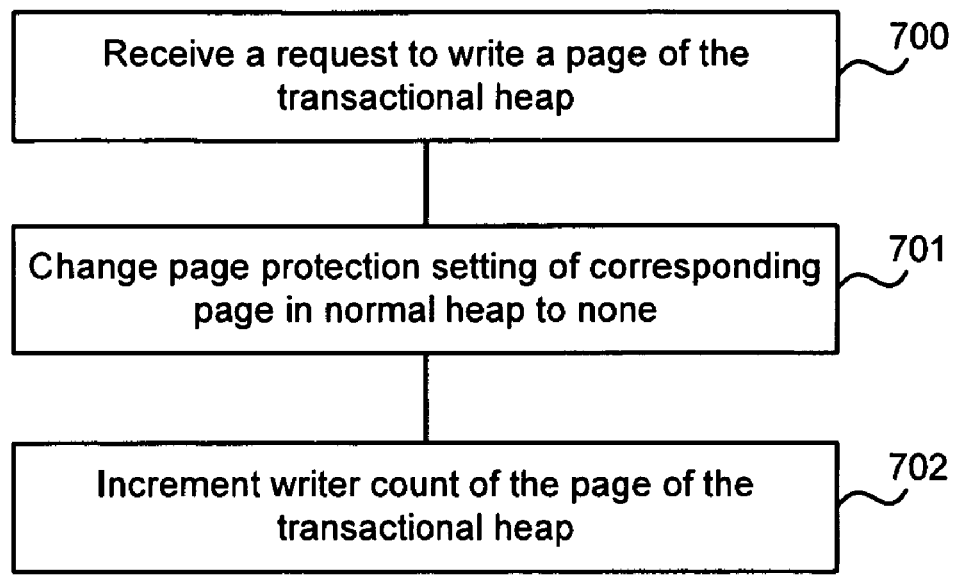
FIG. 7 is a block diagram of a method of making a transactional write at a transactional memory system.

FIG. 7 is a block diagram of an example method at the transactional memory system during a transactional write. A request to write to a page of the transactional heap is received 700 and the page protection setting of the corresponding page in the normal heap is changed to "none" 701. The writer count of the page of the transactional heap being written to is incremented 702.

Figure 8:
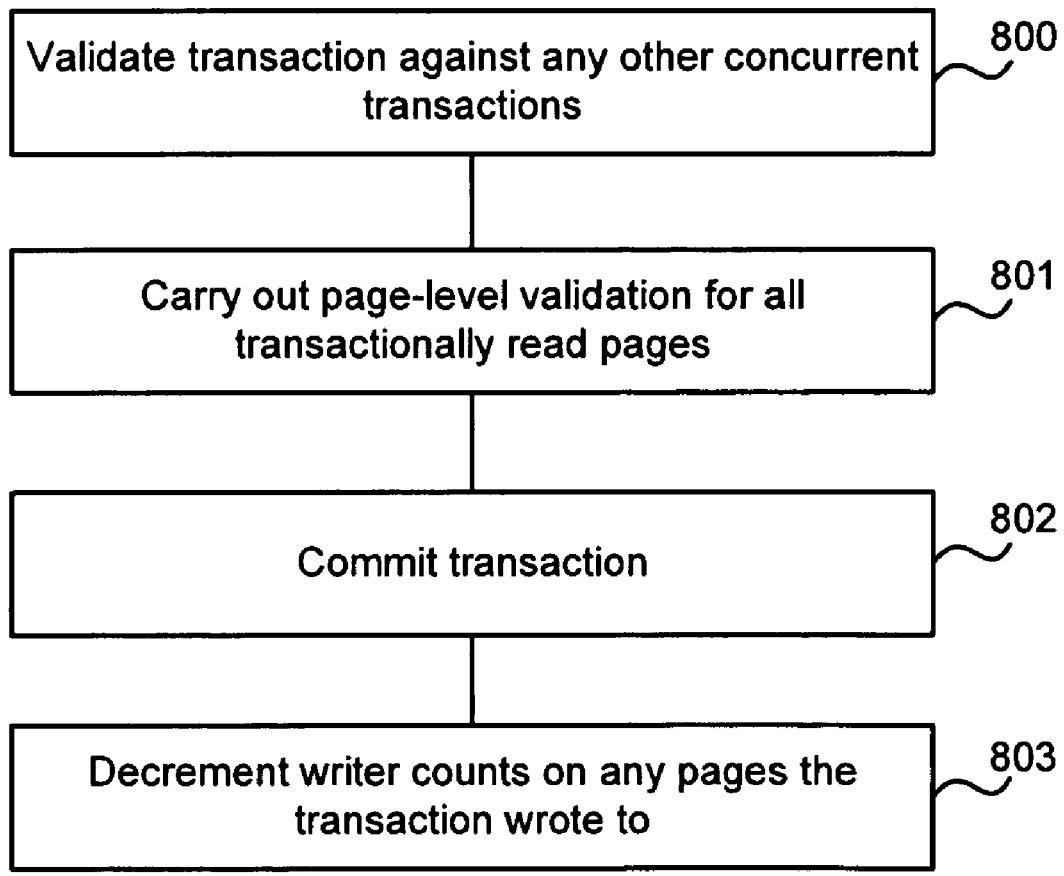
FIG. 8 is a block diagram of a validation method at a transactional memory system.

FIG. 8 is a block diagram of an example validation method at the transactional memory system. A transaction is validated against any other concurrent transactions 800 using any suitable transactional memory system as mentioned above. A page-level validation is also carried out for all pages which were read during the transaction 801. If these two validation steps are successful the transaction commits 802 and the writer count of any pages the transaction wrote to are decremented 803. If either validation step is unsuccessful then the transaction aborts and the writer counts of any pages the transaction wrote to are decremented.

Figure 9:
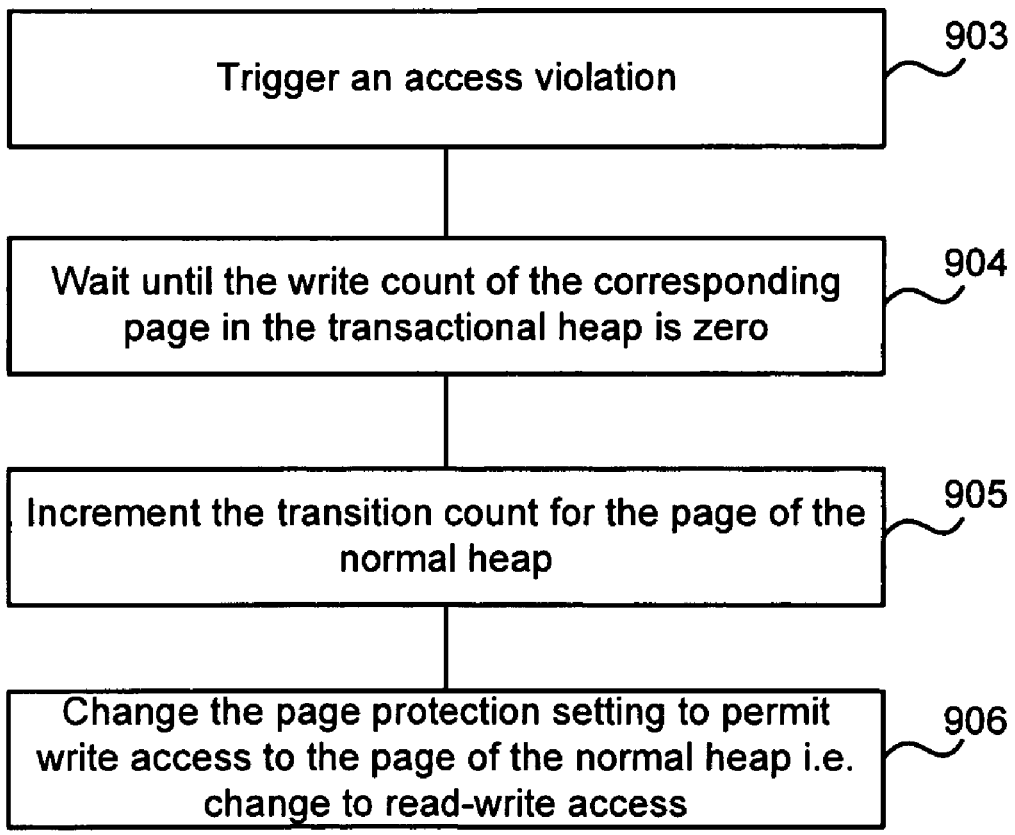
FIG. 9 is a block diagram of a method at an access violation handler during a normal write.
Figure 10:
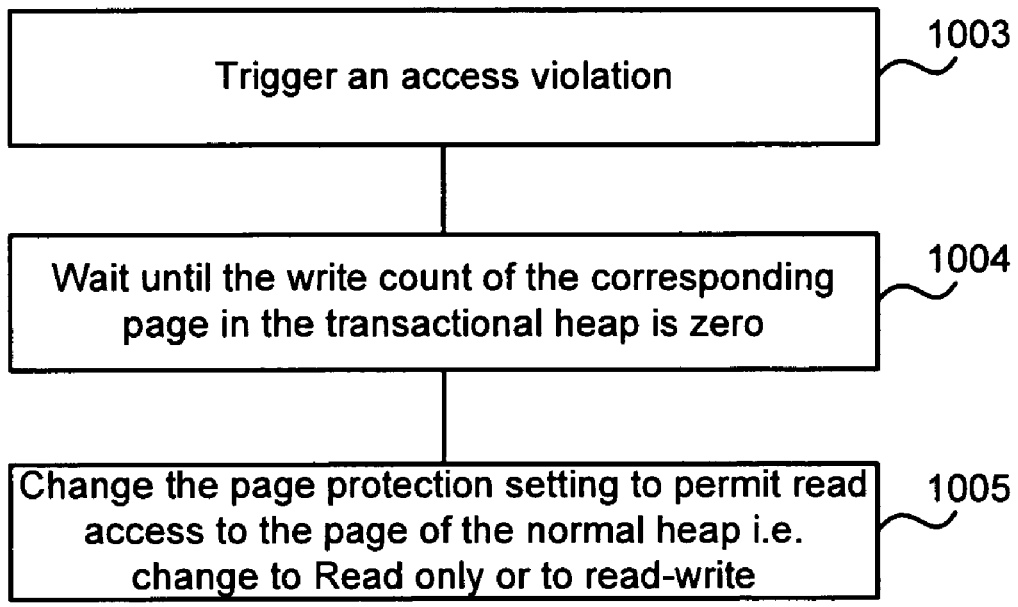
FIG. 10 is a block diagram of a method at an access violation handler during a normal read.

In some embodiments the transactional memory system incorporates an access violation handler which is arranged to carry out the methods of FIGS. 9 and 10. These methods comprise examples of possible conflict management policies. FIG. 9 depicts an access violation handler to be executed in response to access violations on non-transactional writes. If the page protection setting does not permit write access an access violation is triggered 903. The access violation handler waits until the writer count of the corresponding page in the transactional heap is zero 904. It then increments the transition count for the page of the normal heap 905 and proceeds to change the page protection setting to permit write access to the page of the normal heap 906. For example, the page protection setting is changed to read-write access.

FIG. 10 is an example method at an access violation handler to be executed in response to access violations on non-transactional reads. If the page protection setting does not permit read access an access violation is triggered 1003. It proceeds to wait until the writer count of the corresponding page in the transactional heap is zero 1004. It then changes the page protection setting to permit read access to the page of the normal heap 1005. For example, it changes the page protection setting to read only or to read-write access.

In the examples described above, the page protection settings established before transactional memory accesses and checked after transaction validation enable conflicts between normal and transactional memory accesses to be detected. In the case of a transactional write (e.g. FIG. 7) each transaction increments the writer count for the pages it writes to, normal access is revoked before the write is made, and an access violation handler waits until the writer count is back to zero.

In the case of a transactional read (e.g. FIG. 6), before the transaction's first read from a page the system recorded the page's transition count and observed that the page was either inaccessible to normal code or that it was read-only to normal code. After the transaction's normal validation work the system observed that the transition count was unchanged. This means that the page has not been writable by normal code at any point since the read. In a particular embodiment the page-level validation is carried out after the transactional memory level validation (e.g. see FIG. 8). This ensures that data read by the transaction does not become writable during the transactional memory level validation.

In a preferred embodiment described above with reference to FIGS. 1 to 5 the page protection settings for the pages of the transactional heap are unaltered, whereas the page protection settings for the pages or the normal heap are altered. This asymmetric design helps to avoid overhead on non-transacted code. This is beneficial in cases where for example transacted accesses are relatively few compared with normal accesses, or where it is difficult or impossible to access or modify non-transacted code. However, in other embodiments it is possible to revoke permission on the transacted version of a page when accessing it normally. This symmetric design means that it is not required for a transactional memory to explicitly test for access to a given page because that test is done implicitly when the access it attempted. This adds a cost of checking and modifying page protection settings to normal code and is especially useful where transacted accesses are more frequent relative to normal accesses. Other embodiments are now described.

In some embodiments normal access permission may be restored eagerly (i.e. as soon as there are no transactions accessing objects on the page). In other embodiments normal access permission is restored lazily (i.e. when an access violation occurs). In the examples described above with reference to FIGS. 2 to 5 normal access is restored lazily. This implies that access permissions are not changed back and forth if a series of transactions accesses data on the same pages. This facilitates reduction of the cost that supporting strong atomicity adds to code within a transaction.

In some embodiments the page-level reading process is invisible and in other embodiments it is visible. If the page-level reading process is visible then the presence of a reader is known to other threads; if it is invisible then other threads are not aware of the page-level reading process. Page-level visible reading allows the access violation handler to determine if a normal write may conflict with a concurrent reading transaction. In some embodiments this enables the transition count to be omitted because a non-transactional writer may wait for a transactional reader to complete, or may signal a conflict directly to a transactional reader. Invisible reading prevents a normal write from detecting conflicts with concurrent transactional readers. In some embodiments, invisible page-level reading is used in order to reduce overhead added to the transactional memory system as compared with using visible page-level reading.

In the embodiments described above with reference to FIGS. 9 and 10, after an access violation, the access violation handler is arranged to wait until it is safe to change the page protection before doing so and allowing the instruction that caused the access violation to be re-executed. This is referred to herein as the "wait" approach for ease of reference. However, in other embodiments a different approach may be taken. In the event of an access violation occurring such as at blocks 903 and 1003 of FIGS. 9 and 10 respectively, the page protection may be left unchanged and the effect of the memory access that triggered the access violation be emulated as a short transaction. This may comprise the transactional memory system creating code that forms a transaction so that the memory access is executed transactionally and will not lead to a reoccurrence of the access violation.

In some embodiments the access violation handler may distinguish possible conflicts with concurrent transactions from false conflicts. A false conflict occurs where a potential memory access is identified as a conflict and an access violation is generated when in fact the memory access would not have resulted in a conflict. An access violation handler may exploit this distinction by performing a memory access that triggered a false conflict directly to the transactional heap. This will not lead to a reoccurrence of the access violation.

Figure 11:
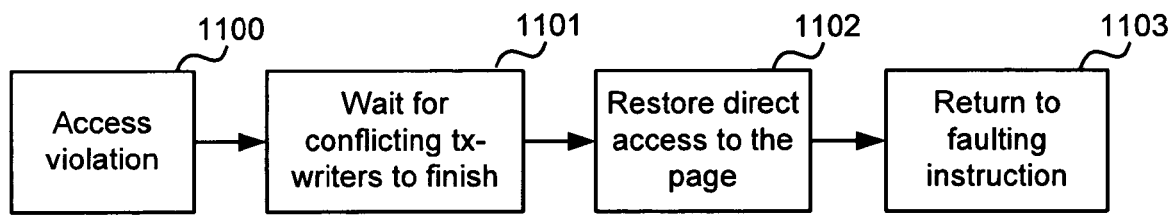
FIG. 11 is a block diagram of an example conflict management policy.

In some embodiments the access violation handler may issue reports of violations caused by non-false conflicts. These reports may aid programmers in debugging software in which they do not expect violations to occur, or when using a programming language in which violations are not considered correct. In some embodiments such reports may only be issued when they indicate a conflict that occurs between a normal access and a valid transaction. In such embodiments the access violation handler, on determining that a non-false conflict has occurred, may generate a tentative report, associate it with a conflicting transaction, and the transactional memory may issue the report when the transaction commits. In some embodiments a "wait" approach is used when handling access violations. The wait approach (or conflict management policy) is illustrated schematically in FIG. 11. When an access violation occurs 1100 the transactional memory system is arranged to wait for any conflicting transactional writers to finish 1101. The transactional memory system then restores normal access to the page 1102 and returns to the faulting instruction 1103. This wait strategy may be implemented without the access violation handler needing to be aware of the way that the transactional memory associated memory addresses with transactional concurrency-control information. Also, the wait strategy leaves the page with normal-access permission so that a series of normal heap accesses to the location may proceed without causing further access violations.

Other conflict management policies may be used by the access violation handler. For example, the access violation handler may be arranged to interact with the underlying transactional memory to cause the conflicting transaction to be aborted.

In the embodiments described herein two mappings of a process's heap are used: the normal heap and the transactional heap. Thus it is possible to identify an object by either its normal heap page address or its transactional heap page address.

In one embodiment, object references are represented using the address in the normal heap. Within a transaction, the translation from these normal references to addresses in the transactional heap is deferred until the actual instructions that read or write the objects. A final peephole optimization pass in the compilation process may be used to combine the translations with other operations. For example, when accessing an object's field the translation becomes an adjustment to the offset. This approach means that, outside the transactional memory system, the language's runtime does not need to be aware of the changes to the structure of the heap and that there is no need to marshal between different forms of object reference when data enters or leaves a transaction. Other embodiments may use an object's address in the transactional heap when referring to the object. This may be preferable if there are many transactional accesses when compared with non-transactional accesses.

In some embodiments memory segmentation hardware may be used to translate addresses into the appropriate heap. For example, one memory segment may describe the normal heap and another memory segment may describe the transactional heap.

The transactional memory system of the embodiments described above may optionally be modified in various ways in order to enhance the speed of operation of the system.

In a first group of embodiments, speed is enhanced by identifying safe memory accesses that cannot trigger or cause conflicts between normal memory accesses and transactional memory accesses, allowing these to proceed without some or all of the steps used to provide strong atomicity as described above. For example, page-level checks may be omitted for normal memory accesses in some cases and some transactions need not revoke normal-access page permissions. The safe memory accesses may be identified in any suitable manner, such as using static analysis. For example, static analysis may be used to determine that certain kinds of operation do not cause conflicts between normal and transacted memory accesses. Such operations may be compiled so that they do not cause access violations. Some particular examples of operation which may be identified and compiled comprise:

Access to a newly allocated or thread-private object does not conflict with an access by another thread.

Access to read-only data does not conflict with an access by another thread.

Normal access to data that is not accessed transactionally cannot conflict with a transactional access by another thread (and vice versa for data that is not accessed non-transactionally).

A safe memory access may be a normal access that cannot conflict with a concurrent transaction (that is, there will be no transaction that has started, but not yet finished committing or aborting, whose implementation will make a conflicting access). A safe memory access may also be a transacted access whose implementation cannot conflict with a normal access (that is, there will be no conflicting normal access between the time of the transactional access and the time when the transaction finishes its commit or abort).

In some embodiments, safe memory accesses made by the particular programming language being used and the particular runtime system are identified during compilation. These safe memory accesses cannot conflict with transactions and hence do not require page-level access checks. This is exploited by translating the memory addresses of the normal heap being accessed so that they use the transactional heap. Page-level access checks are then not required in the asymmetric embodiments described above.

A non-exhaustive list of examples of such safe memory accesses which may be identified is now given:

Access to virtual method tables and array lengths. These are initialized when an object is allocated and are then immutable.

Loads of values into dead registers. These are used for explicit null reference tests. These are executed for their possible side effect of triggering an access violation. The actual value loaded is not required.

Access to the data structures used for memory allocation. The allocator's free lists, and so on, are accessed only by the allocator in some embodiments. Ordinary garbage collection may be used to reclaim objects that have been allocated by transactions that roll back.

Access to the data structures used by the transactional memory implementation. This does not run transactionally in some embodiments. For example, its data structures are disjoint from those accessed by the application.

Accesses performed by the garbage collection (GC) implementations. These do not run transactionally in some embodiments. For example they are integrated with the transactional memory and aware of its log formats if a GC is triggered within a transaction.

FIG. 12 shows an example of a source code fragment 1200 and the native code results 1201 of a process of identifying safe memory accesses in the source code fragment and translating (during compilation) the memory addresses of the normal heap being accessed so that the transactional heap is used. I2, I4 and I5 access immutable data managed by the runtime system, so access checks are not required on them. This is exploited by having those instructions access the transactional heap at an offset of 0x40000000 from the normal heap. The source code fragment 1200 iterates over an array uniquesegments. Each element of the array refers to a hashtable. ComputeUniqueSegments computes the total number of elements in these tables. It executes non-transactionally, but the tables themselves are manipulated by transactions. The main work in this example is in the block following the label loop. I1 loads the register eax with a reference to the array. I2 compares the index being accessed with the arrays bounds. I3 loads a reference to a particular hashtable from the array. I4 loads the virtual-method-table pointer from the hashtable, and I5 performs the virtual call. The accesses made by I2, I4 and I5 may all be made to the transactional heap because they access immutable data.

In some embodiments, safe memory accesses from normal code are identified. For example, these types of safe memory accesses are those to fields and arrays that are not accessed inside a transaction. If a location is not accessed transactionally then it cannot be subject to a normal-transacted access conflict. This means that page-level access checks may be avoided and the access may be implemented by using the transactional heap directly. If a location is read by transactions, but not written, then embodiments may handle normal loads for it using the transactional heap. In some embodiments, a NAIT analysis is used to identify such safe memory accesses to fields and arrays. NAIT analysis is described in detail in Shpeisman et al. "Enforcing isolation and ordering in STM." PLDI 07:Proc. 2007 ACM SIGPLAN Conference on Programming Language Design and Implementation, pages 78-88, 2007 which is incorporated herein by reference.

In some embodiments, an extension to Steensgaard's point-to analysis (described in Steensgaard "Points-to analysis in almost linear time." In POPL 96 Proceedings of the 23$^{rd}$ ACM SIGPLAN-SIGACT symposium on Principles of programming languages, pages 32-41 ACM 1996 which is incorporated herein by reference) is used to identify objects that are not accessed in transactions, and objects that are read-only in transactions. Each element in the points-to set of a load or store is marked as transactional or normal based on the kind of access being performed. The normal memory accesses are then transformed into accesses of the transactional heap if, after the analysis, none of the elements in the access's points-to set are accessed transactionally. Similarly, a read may be transformed if none of these elements are written transactionally. Note that this general approach may apply readily to other points-to-analyses.

In some embodiments, a static escape analysis is performed to identify objects that remain thread-local even though they are accessed transactionally as well as normally. Accesses to these objects may be assumed to be safe. An intra-procedural forward data-flow analysis may be used to identify accesses during object-initialization as safe.

Referring to the example of FIG. 12, the analyses mentioned above enable the accesses at I1 and I3 to be identified as safe and consequently use the transactional heap directly. The access at I1 is safe because there are no stores to the uniqueSegments field in atomic blocks (which is detected by static analysis). The access at I3 is safe because the array that this.uniqueSegments refers to is not updated inside a transaction. Thus these instructions may be rewritten as:

mov eax,dword ptr [edi+0x40000020]//I1
mov ecx,dword ptr [eax+ebx*4+0x40000008]//I3

In some embodiments safe memory accesses from transactions are identified using any of the methods described above for identifying safe accesses from non-transacted code. These types of safe memory accesses are those transactional accesses to data which is not accessed non-transactionally. These transactional accesses may be made without modifying the page protection settings and this reduces the amount of processing required. As well as reducing the number of page protection changes this may also reduce the number of false conflicts.

In some embodiments faulting instructions which trigger an access violation are updated by replacing those faulting instructions with instructions to perform a short transactional access. Dynamic code generation or dynamic patching to recompile code that is likely to generate frequent access violations may be carried out.

Figure 13:
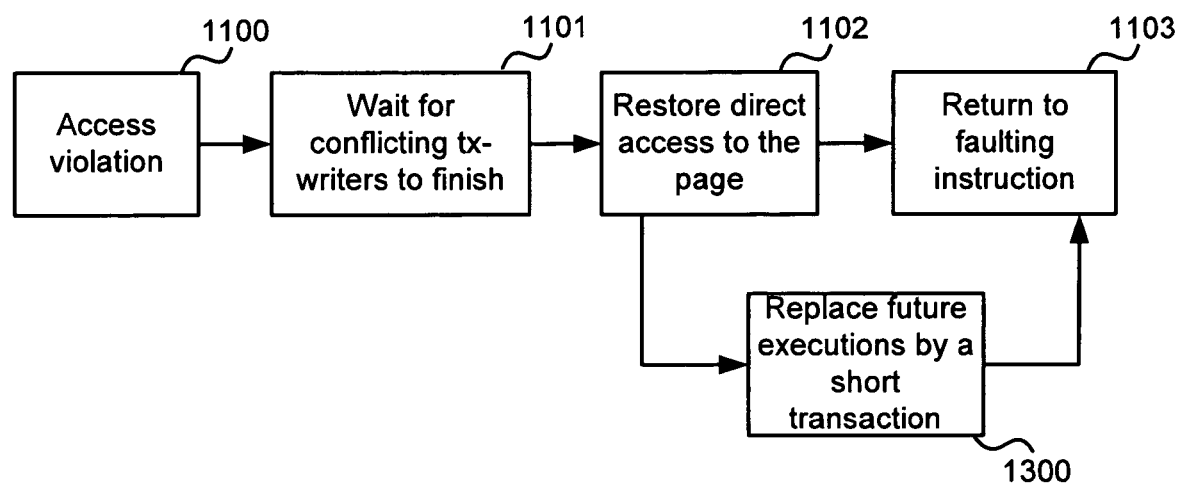
FIG. 13 is a block diagram of another example conflict management policy.

FIG. 13 is a schematic diagram of an example method at a transactional memory system of responding to an access violation and comprises another example of a conflict management policy. FIG. 13 is the same as FIG. 11 except that a block is added to indicate how faulting instructions are replaced by short transactions. An access violation occurs 1100 and the transactional memory system waits for any conflicting transactional writers to finish 1101. Normal access to the page is restored 1102 and also future executions of the faulting instruction are replaced 1300 by a short transaction designed to produce the same memory access result but without generating an access violation or conflict as a result of being a transaction.

It is recognized herein that using a short transaction is generally slower than the original code that has been replaced and therefore it is only worthwhile making the replacement if the result is an avoidance of future access violations. Also, it is recognized herein that replacing one source of access violations may simply end up delaying an access violation rather than avoiding it. This situation may then result in the need to replace many instructions and so the damage to code quality may be greater than expected.

The simple heuristic strategy of, on an access violation, both replacing the source of the access violation and restoring access to the page in question, is found to work well in practice.

Figure 14:
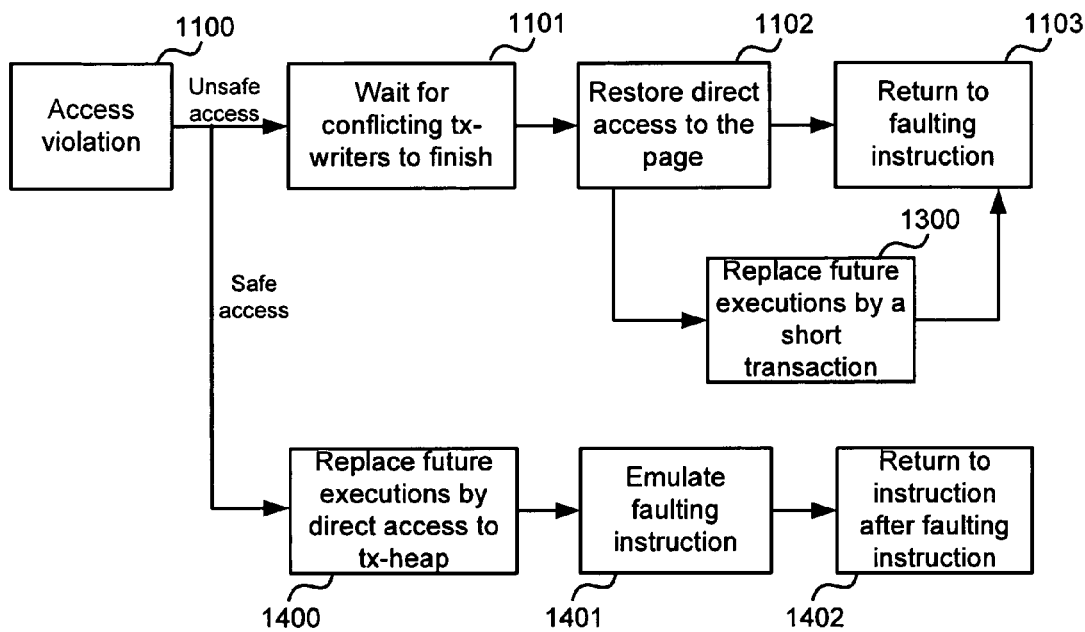
FIG. 14 is a block diagram of another example conflict management policy.

FIG. 14 is a block diagram of another conflict management policy. This is the same as the example shown in FIG. 13 except that if a safe access is identified as the cause of the access violation, future executions are replaced by direct access to the transactional heap 1400. The faulting instruction is emulated 1401 and the process returns to the instruction after the faulting instruction 1402. In embodiments which use this conflict management policy changes may be made to the compilation of non-transacted code. The conflict management policy of FIG. 14 may reduce the number of virtual memory pages accessed by non-transactional code and consequently help to speed up operation of safe accesses that do not experience false conflicts with transactions. The code may be initially run without the optimizations discussed above with reference to FIG. 13 and upon an access violation, the code is updated automatically to a version that includes the optimizations.

In an embodiment, binary patching is used to make code updates such that faulting instructions are replaced by short transactions and safe accesses are replaced by direct accesses to the transactional heap as described above. FIG. 15 illustrates this using the Hashtable.Count property that is called from the earlier example in FIG. 12 when it is compiled to use standard library classes. The original source code is shown at 1500 of FIG. 15 and comprises the source code for the Count property that is used by the ComputeUniqueSegments fragment from FIG. 12. The corresponding native code is shown at 1501 of FIG. 15 and comprises support for patching access violations generated at I10 where a field access is performed.

In an embodiment, each basic block that may trigger an access violation is modified. An alternate version of the basic block is generated with each possibly-faulting operation replaced by a call onto a library function that performs the operation as a short transaction. These blocks may benefit from generation early during compilation when type information is available. Also, the implementation of the short transactions may be inlined and transactional memory system metadata may be reused from one short transaction to the next. The blocks may be placed out-of-line at the end of each function and control-flow edges to them are considered rarely taken in some embodiments. In the example of 1501 this is the block labeled alternate, reading an integer-valued field at an offset of 16 from the object reference held in ecx (the calling convention used places the first two parameters in registers ecx and edx).

In some embodiments a table is generated listing the locations to patch. An access violation after primary (in the example of FIG. 15, 1501) is then patched by atomically replacing the first instruction of primary with a branch to alternate. In some embodiments, particularly with variable-length instruction sizes, the start of a block is padded with a nop instruction so that only one instruction may be overwritten when patching. This prevents a patch from spilling onto an instruction that a concurrent processor may be about to fetch.

In an implementation using just in time (jIT) compilation the method to be updated may be recompiled. In this case the code quality may be slightly better than when using patches since the alternate basic blocks do not need to be present in memory ahead of time and it is not required to pad code with nop instructions to overwrite.

In some embodiments steps are taken to reduce the likelihood that access violations will occur. For example, this is achieved by using different pages for memory allocations when running inside transactions from when running non-transactionally. Other example heuristics for reducing the likelihood that access violations will occur include:

Relocating objects during garbage collection according to a prediction of whether or not they will be accessed transactionally in the near future (e.g. based on whether or not they have been accessed transactionally in the recent past).

Relocating objects during garbage collection such that objects being accessed by different threads will remain on different pages.

In the embodiments described herein two mappings of the physical heap are used: a normal heap and a transactional heap. However, it is also possible to use more than one normal heap, with each normal heap providing access to a fraction of the contents of each physical page. For example, if four normal heap mappings are used, each normal heap address maps to ¼ of a page in the physical heap. This provides finer-grained memory access control, thus reducing the possibility of false conflicts, with a cost of additional page translations.

Figure 16:
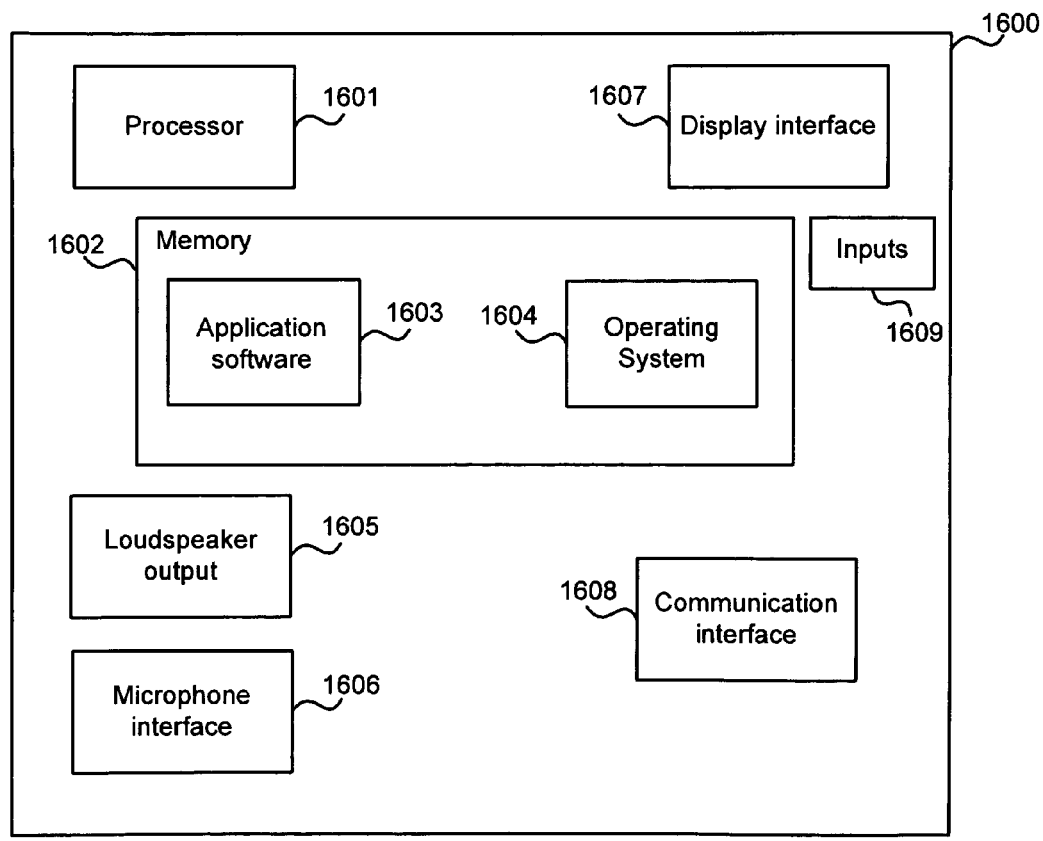
FIG. 16 illustrates an exemplary computing-based device in which embodiments of a transactional memory system may be implemented.

FIG. 16 illustrates various components of an exemplary computing-based device 1600 which may be implemented as any form of a computing and/or electronic device, and in which embodiments of a transactional memory system may be implemented.

The computing-based device 1600 comprises one or more inputs 1609 which are of any suitable type for receiving media content, Internet Protocol (IP) input, and other inputs. The device also comprises communication interface 1608.

Computing-based device 1600 also comprises one or more processors 1601 which may be microprocessors, controllers or any other suitable type of processors for processing computing executable instructions to control the operation of the device in order to provide transactional memory functionality. . . . Platform software comprising an operating system 1604 or any other suitable platform software may be provided at the computing-based device to enable application software 1603 to be executed on the device.

The computer executable instructions may be provided using any computer-readable media, such as memory 1602. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output 1605, 1606 is also provided such as an audio and/or video output to a display system integral with or in communication with the computing-based device. An interface 1607 to a display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of detecting memory access conflicts, the method comprising:
    creating a plurality of mappings in a virtual address space of a physical heap used by a process executed on a processor, each of the mappings having a plurality of memory regions and each memory region having an access permission, the creating the plurality of mappings comprises:
        creating a normal heap and a transactional heap both being mappings in the virtual address space of the physical heap and having different virtual address ranges from one another;
        using the normal heap when making non-transactional memory accesses to the physical heap; and
        using the transactional heap when making transactional memory accesses to the physical heap;
    controlling the access permissions of the memory regions in order to detect memory access conflicts; and
    carrying out a static analysis of the process to identify safe instructions where memory access conflicts are not expected and reducing the control of the access permissions in these cases.

2. A method as claimed in claim 1 which further comprises controlling the access permissions of the normal heap in the event that a request to access the transactional heap is received.

3. A method as claimed in claim 1 which further comprises arranging the processor to carry out a conflict management policy in the event that a memory access conflict is detected.

4. A method as claimed in claim 3 wherein the conflict management policy comprises controlling the access permissions such that non-transactional memory accesses proceed in series with transactions.

5. A method as claimed in claim 3 wherein the conflict management policy comprises carrying out dynamic code generation to update instructions that previously resulted in a memory access conflict.

6. A method as claimed in claim 5 wherein the dynamic code generation comprises generating short transactions to carry out memory accesses which were previously non-transactional.

7. A method as claimed in claim 3 wherein the conflict management policy comprises controlling the access permissions such that an attempted memory access made using the normal heap waits until a memory access made using the transactional heap has finished.

8. A method as claimed in claim 3 wherein the conflict management policy comprises performing an attempted memory access made using the normal heap as a short transaction.

9. A method as claimed in claim 1 which further comprises using memory segmentation to achieve the mappings between the physical heap and each of the normal and transactional heaps.

10. A method as claimed in claim 1 which further comprises creating N normal heaps where N is a positive integer of value 2 or more, each memory region of each normal heap providing access to 1/n of a memory region of the physical heap and each memory region of each normal heap having an independently controllable access permission.

11. A method as claimed in claim 1 which further comprises implementing non-transactional memory accesses identified as safe, as transactional memory accesses.

12. A method as claimed in claim 1 which further comprises identifying transactional accesses to memory regions not expected to be accessed non-transactionally.

13. A method as claimed in claim 1 which further comprises issuing a report of a detected memory access conflict to facilitate debugging software.

14. A method as claimed in claim 1 which further comprises storing objects to be used by the process at memory regions of the physical heap and controlling the location of those stored objects within the physical heap in order to reduce the number of access violations.

15. A method of reporting memory access violations, the method comprising:
   creating a normal heap being a mapping in a virtual address space of a physical heap used by a process executed on a processor, the process comprising at least one thread, that thread comprising instructions for both transactional and non-transactional accesses to the physical heap which may execute concurrently as part of that thread;
   creating a transactional heap being a mapping in the virtual address space, the transactional heap having a different virtual address range from the normal heap;
      wherein the process of creating the normal and transactional heaps comprises specifying a plurality of memory regions, each memory region of the normal heap corresponding to a memory region of the physical heap and each memory region of the transactional heap corresponding to a memory region of the physical heap and where each of the memory regions of the normal heap has an access permission;
      using the normal heap when making non-transactional memory accesses to the physical heap;
      using the transactional heap when making transactional memory accesses to the physical heap;
      detecting attempts to concurrently access the same memory region of the physical heap from both the normal and transactional heaps by controlling the access permissions to selectively revoke access to the physical heap by non-transactional memory accesses.

16. A method as claimed in claim 15 wherein the memory regions are pages of memory.

17. A method as claimed in claim 16 which further comprises controlling the access permissions such that non-transactional memory accesses proceed in series with transactions.

18. One or more device-readable media with device-executable instructions for performing steps comprising:
   creating a normal heap being a mapping in a virtual address space of a physical heap used by a process executed on a processor, the process comprising at least one thread, that thread comprising instructions for both transactional and non-transactional accesses to the physical heap which may execute concurrently as part of that thread;
   creating a transactional heap being a mapping in the virtual address space, the transactional heap having a different virtual address range from the normal heap;
      wherein the process of creating the normal and transactional heaps comprises specifying a plurality of memory regions, each memory region of the normal heap corresponding to a memory region of the physical heap and each memory region of the transactional heap corresponding to a memory region of the physical heap and where each of the memory region of the normal heap has an access permission;
      using the normal heap when making non-transactional memory accesses to the physical heap;
      using the transactional heap when making transactional memory accesses to the physical heap;
      detecting attempts to concurrently access the same memory region of the physical heap from both the normal and transactional heaps by controlling the access permissions.

* * * * *